Figure 1:
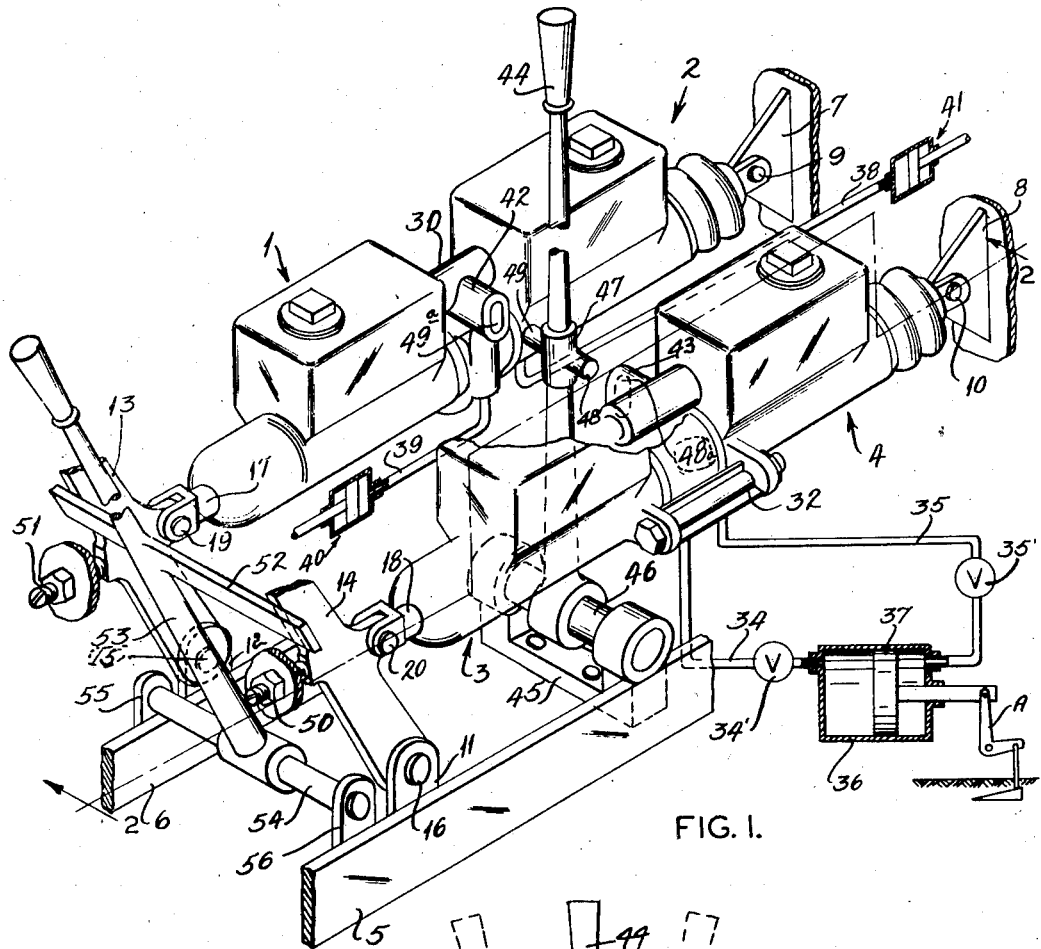

Nov. 16, 1948.　　　　A. N. MILSTER　　　　2,453,852
MECHANISM FOR SELECTIVE OPERATION OF A
PLURALITY OF MASTER CYLINDERS
Filed Jan. 24, 1947

INVENTOR:
ARTHUR N MILSTER
BY
ATTORNEY.

Patented Nov. 16, 1948

2,453,852

UNITED STATES PATENT OFFICE 2,453,852

MECHANISM FOR SELECTIVE OPERATION OF A PLURALITY OF MASTER CYLINDERS

Arthur N. Milster, St. Louis, Mo., assignor to Wagner Electric Corporation, St. Louis, Mo., a corporation of Delaware Application January 24, 1947, Serial No. 724,056

5 Claims. (Cl. 60—54.5)

This invention relates to means for actuating pressure fluid operated devices and in its more specific aspects is directed to means for selectively severally or jointly operating the fluid motor means for said devices.

The object of this invention is to provide a pressure fluid system having a plurality of master cylinders, which may be actuated to produce a uniform fluid pressure in all motors connected serially or in parallel thereto and in which each master cylinder is connected to pressure fluid motor means and with means provided to selectively severally operate the motor means or jointly operate any two or more of the motor means.

In the drawings

Figure 2:
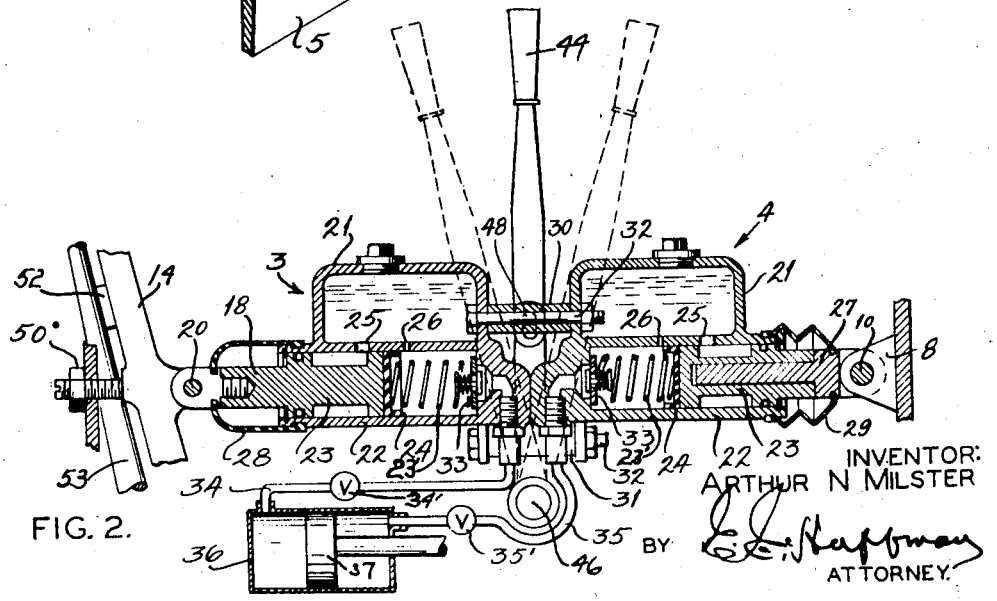

Figure 1 is a perspective view of a plurality of master cylinders embodying the invention; and Figure 2 is a sectional view taken along the line 2—2 of Figure 1.

Referring now to the drawings, numerals 1, 2, 3, and 4 are master cylinder assemblies which are suitably supported upon frame members 5 and 6 and one end of each connected group of master cylinders is pivotally connected to suitable anchor brackets 7 and 8 by pivot pins 9 and 10. Frame members 5 and 6 support the opposite ends of each connected group of master cylinders by means of brackets 11 and 12 through levers 13 and 14 and pins 15 and 16. Piston rods 17 and 18 of master cylinder assemblies 1 and 3 are connected to suitable brackets on lever 13 and 14, respectively, by means of pins 19 and 20.

Figure 2 shows the details of the master cylinder assemblies and each assembly comprises a casing 21 having a fluid reservoir formed in the upper portion thereof. Cylinders 22 are formed in the lower part thereof and each is provided with a piston 23 and a packing cup 24. Ports 25 and 26 formed in the wall of each cylinder provide means for establishing communication between the interior of cylinders 22, 22 and their respective reservoirs.

The piston rod 18 of master cylinder assembly 3 is integrally associated with piston 23 and in master cylinder assembly 4 the piston rod 27 has a telescopic connection with piston 23. Flexible protective boots 28 and 29 are provided for the purpose of preventing the ingress of grit and other foreign matter into the respective cylinders.

Each of the master cylinder assemblies is provided with suitable connecting fixtures 30 and 31. Suitable brackets provided on the master cylinders cooperate with fixtures 3 and 31 to enable the two master cylinder assemblies to be rigidly connected by means of bolts 32.

One end of each cylinder 22 is suitably ported and combined with the valve assemblies 33 controls the flow of fluid therefrom. A spring 23' is inserted between each packing cup 24 and valve assembly 33. Each valve assembly 33 may be constructed to operate similarly to those disclosed in United States Patent No. 2,349,416, issued May 23, 1944.

The port end of each cylinder 22 is connected to the ends of a double acting pressure fluid motor, which comprises a cylinder 36 and a piston 37, by means of conduits 34 and 35 and suitable fittings. Suitable shut-off valves 34' and 35' are connected in each of the conduits 34 and 35. The double acting pressure fluid motor is connected to an agricultural implement A by an appropriate linkage and controls the depth of surface penetration of the implement. The motor may be used to control other devices, such as a machine tool part as shown in a companion application concurrently filed.

Master cylinder assemblies 1 and 2 are constructed in the same manner as master cylinder assemblies 3 and 4 and conduits 38 and 39, corresponding to conduits 34 and 35, are, however, connected to individual single acting pressure fluid motors 40 and 41, respectively. These motors are preferably the brake motors of a tractor and are returned to their initial position by the return spring of the brake assembly with which they are associated as is customary in the art.

Fixtures 30 and 31 are provided with bosses 42 and 43' which have axially arranged slots 48a and 49a, respectively, therein. An actuating lever 44 is pivoted on a pin 46 fixed in bracket 45 suitably secured to frame members 5 and 6. A fixture 47 is disposed upon handle 44 and is provided with projections 48 and 49, each of which is adapted to be selectively engaged in slots 48a and 49a of bosses 42 and 43, handle 4 being capable of movement along pin 46.

Suitable adjustable stops 50 and 51 are provided which are engageable with the operating levers 13 and 14 for the purpose of taking up thrust during the operation of some of the master cylinders as will be subsequently set forth.

Another actuating lever 53 is pivotally connected to members 5 and 6 by means of pin 54 arranged in brackets 55 and 56 and a transverse member 52 is connected to lever 53 and is of sufficient length to be engageable with both levers 13 and 14. Lever 53 is provided for the purpose of jointly operating all four master cylinder assemblies.

Referring now to the operation of the mechanism and assuming that the system is filled with a suitable fluid and it is desired to actuate piston 37 of the double acting pressure fluid motor to the left, lever 44 is shifted along pin 46 so that projection 48 will be inserted in slot 48a of boss 43. When the operating lever 44 is rotated in a clockwise direction, there will be relative motion between cylinder 22 and piston 23 closing off port 26 and forcing fluid past valve 33 in master cylinder assembly 4 and thence into the motor to move the piston to the left and lift implement A upward. If it is desired to actuate piston 37 to the right, then the operating lever 44 is rotated counter-clockwise whereupon the previously described operation with respect to the fluid will take place in cylinder 22 of master cylinder assembly 3, thereby causing piston 37 to be actuated to the right and lowering implement A. During this latter operation the adjustable stop 50 absorbs the thrust caused by the compression of the fluid in the master cylinder of assembly 3.

When it is desired to lock implement A in a raised position, lever 44 is shifted to actuate master cylinder assembly 4 and piston 37 will be moved to the left and when the proper raised position of implement A is reached, valve 35' is closed to entrap fluid in the motor to the right of piston 37. Thereafter lever 44 is actuated to the left or lever 14 may be actuated to the right to actuate master cylinder assembly 3 to apply the necessary pressure to the left side of piston 37 whereupon valve 34' is closed, thereby locking implement A in raised position. When implement A is to be locked in a lowered position, lever 44 is shifted to actuate master cylinder assembly 3, thereby moving piston 37 to the right, then valve 34' is closed, entrapping fluid in the left end of the motor and thereafter lever 14 or lever 44 may be actuated to the right to actuate master cylinder assembly 4 until the necessary pressure is applied to the right side of piston 37 whereupon valve 35' is closed, thereby locking implement A in a lowered position. Lever 14, when actuated, will actuate both master cylinder assemblies but since fluid is entrapped on one side of piston 37 because of the closure of valves 34' or 35' only that master cylinder assembly will apply pressure in which circuit either of valves 34' or 35' is open.

In the event it is desired to actuate motors 40 and 41, which are operatively connected to master cylinder assemblies 1 and 2 and may, e. g., actuate the brakes on the drive wheels of a tractor, then operating lever 44 will be moved to the left, as viewed in Figure 1, to enable the projection 49 to be inserted in slot 49a in boss 42 whereupon the same selective operation may be applied to the master cylinder assemblies 1 and 2, as described in connection with master cylinder assemblies 3 and 4. The motors are individually operated to assist in the steering of the tractor. When both master cylinder assemblies 1 and 2 are actuated by lever 13, equal pressure is produced in each and both motors are actuated to arrest motion in the tractor. In the event the dual motor is actuating a machine tool part, then master cylinder assemblies 1 and 2 and the motors connected thereto would obviously be associated with other parts of the machine tool.

If it is desired to operate all four master cylinder assemblies, then actuating lever 53 is rotated in a clockwise direction whereupon both actuating levers 13 and 14 will be moved in a clockwise direction and the same operation as set forth above for each of the individual units will be performed simultaneously, thereby developing equal pressure in each master cylinder and causing the double acting motor and the single acting motors 40 and 41 to be simultaneously actuated and with equal pressure.

The pivotal connections at 9, 10, 19, and 20 enable the assemblies to pivot relatively to the respective supports during the operation of each of the units jointly or severally to prevent any possible binding of the pistons in the respective cylinders.

The return movement of pistons 23 in cylinders 22 of master cylinder assemblies 3 and 4 to the position indicated in Figure 2 is accomplished by springs 23' after the operator releases lever 14 or 44. When master cylinder assemblies 1 and 2 are actuated, the same springs therein return them to inoperative position assisted by the return springs on the brake assemblies with which motors 40 and 41 are associated, the springs in said brake assemblies compressing fluid in the conduits 38 and 39 and forcing it past valves corresponding to valves 33 in the cylinders of the master cylinder assemblies 1 and 2 as is well known in the art.

Having fully described my invention, that which I claim as novel and desire to protect by Letters Patent of the United States is:

1. A mechanism comprising a plurality of pressure fluid motor means; a plurality of pressure fluid producing means; means to establish communication between each motor means and a pressure fluid producing means; a shiftable member to selectively severally actuate said pressure fluid producing means to thereby severally selectively actuate said motor means; means to selectively apply equal pressure to some of said motor means; means to selectively apply equal pressure to the other of said motor means; and means to apply equal pressure to all of said motor means.

2. A mechanism comprising two pressure fluid actuated motors; a pressure fluid producer connected to each motor; a dual motor which includes a cylinder having a piston therein dividing the cylinder into two chambers; a pressure fluid producer connected to each chamber; a lever to severally selectively actuate any of said pressure fluid producers; a lever to jointly actuate the pressure fluid producers connected to said two motors to enable both of said motors to have a substantially equal pressure applied to each; a lever to jointly actuate the pressure fluid producers connected to said dual motor chambers to apply a substantially equal pressure to both sides of said piston to prevent motion thereof; and a lever to jointly actuate all of said pressure fluid producers to thereby apply equal pressure to all motors.

3. A mechanism comprising two pressure fluid actuated motors; a pressure fluid producer connected to each motor; means to connect said pressure fluid producers together; a dual motor which includes a cylinder having a piston therein dividing the cylinder into two chambers; a pressure fluid producer connected to each chamber; means to connect said last mentioned pressure fluid producers together; a lever to severally selectively actuate any of said pressure fluid producers; a lever to jointly actuate the pressure fluid producers connected to said two motors to enable both of said motors to have a substantially equal pressure applied to each; a lever to jointly actuate the pressure fluid producers connected to said dual motor to apply a substantially equal pressure to both sides of said piston to prevent motion thereof; and a lever to jointly actuate all of said pressure fluid producers to thereby apply equal pressure to all motors.

4. A mechanism comprising two pressure fluid actuated motors; a pressure fluid producer connected to each motor; means to rigidly connect said producers together; means to pivotally support said connected pressure fluid producers; a dual motor which includes a cylinder having a piston therein dividing the cylinder into two chambers; a pressure fluid producer connected to each chamber; means to rigidly connect said last mentioned pressure fluid producers together; means to pivotally support said last mentioned connected pressure fluid producers; a lever to severally selectively actuate any of said pressure fluid producers; a lever to jointly actuate the pressure fluid producers connected to said two motors to enable both of said motors to have a substantially equal pressure applied to each; a lever to jointly actuate the pressure fluid producers connected to said dual motor to apply a substantially equal pressure to both sides of said piston to prevent motion thereof; and a lever to jointly actuate all of said pressure fluid producers to thereby apply equal pressure to all motors.

5. A mechanism comprising two motors; a pressure fluid producer connected to each motor; a dual motor comprising a cylinder having a piston therein to divide the cylinder into two chambers; a pressure fluid producer connected to each chamber; a pivoted lever to selectively severally actuate the pressure fluid producers; a second lever to jointly actuate the pressure fluid producers connected to said two motors to thereby apply a substantially equal pressure to each motor; a third lever to jointly actuate the pressure fluid producers connected to said chambers to thereby apply a substantially equal pressure to both sides of said piston to prevent motion thereof; and a fourth lever to jointly actuate all of said pressure fluid producers to thereby apply a substantially equal pressure to both of said motors and to both sides of said piston.

ARTHUR N. MILSTER.

No references cited.